(12) United States Patent
Yen et al.

(10) Patent No.: US 9,202,058 B1
(45) Date of Patent: Dec. 1, 2015

(54) ROOT VOLUME ENCRYPTION MECHANISM IN PARA-VIRTUALIZED VIRTUAL MACHINE

(71) Applicants: Po-Hsun Yen, Taipei (TW); Chuan-Hung Lin, Taipei (TW); Jie-Ren Shih, Taipei (TW)

(72) Inventors: Po-Hsun Yen, Taipei (TW); Chuan-Hung Lin, Taipei (TW); Jie-Ren Shih, Taipei (TW)

(73) Assignee: Trend Micro Inc., Tokyo (JP)

( * ) Notice: Subject to any disclaimer, the term of this patent is extended or adjusted under 35 U.S.C. 154(b) by 0 days.

(21) Appl. No.: 14/325,221

(22) Filed: Jul. 7, 2014

(51) Int. Cl.
*G06F 21/57* (2013.01)
*G06F 9/455* (2006.01)
*G06F 21/60* (2013.01)

(52) U.S. Cl.
CPC .............. *G06F 21/57* (2013.01); *G06F 9/4555* (2013.01); *G06F 21/60* (2013.01)

(58) Field of Classification Search
CPC ..... G06F 21/57; G06F 21/572; G06F 21/575; G06F 21/60; G06F 21/62
See application file for complete search history.

(56) References Cited

U.S. PATENT DOCUMENTS

| 6,718,548 | B1 * | 4/2004 | Hsiao | 717/174 |
| 2004/0158711 | A1 * | 8/2004 | Zimmer | 713/165 |
| 2007/0294676 | A1 * | 12/2007 | Mellor et al. | 717/139 |
| 2011/0302400 | A1 * | 12/2011 | Maino et al. | 713/2 |
| 2012/0011354 | A1 * | 1/2012 | Owen | 713/2 |

* cited by examiner

*Primary Examiner* — Benjamin Lanier
*Assistant Examiner* — Arya Golriz
(74) *Attorney, Agent, or Firm* — Beyer Law Group LLP

(57) ABSTRACT

Techniques to perform root volume encryption in a para-virtualized virtual machine are described. A disk layout supports the root volume encryption, set key flow, and normal boot flow of the para-virtualized virtual machine. An implementation for performing encryption for a cloud-based service is disclosed.

9 Claims, 12 Drawing Sheets

Pre-boot Image Installation Flow in Fully Virtualized VM

1. Umount boot partition
2. Resize boot filesystem
3. Install Pre-boot image
4. Backup original MBR
5. Install Securecloud MBR
6. Backup Securecloud MBR
7. Initialize scratch space
8. Configure stage2 loader
9. Patch initrd
10. Reboot VM

ROOT VOLUME ENCRYPTION MECHANISM IN PARA-VIRTUALIZED VIRTUAL MACHINE

FIELD OF THE INVENTION

The present invention is generally related to provide data protection. More particularly, the present invention is directed to achieve root volume encryption in a para-virtualized virtual machine.

BACKGROUND OF THE INVENTION

SecureCloud™ is a key management and data encryption solution available from Trend Micro, Inc. SecureCloud™ provides a key management system which addresses a need to provide data protection for cloud environments, virtual environments, and physical machines using encryption with policy-based key management and unique server validation. For example, SecureCloud™ may be used to protect an application running on a cloud when companies use the cloud for computing and virtualization. As an example, SecureCloud™ may be used to provide cloud security for Amazon Web Services™ (AWS), Elastic Compute Cloud (Amazon EC2).

SecureCloud™ provides full disk encryption with advanced key policies to keep data private, providing protection and security for sensitive data stored with cloud service providers. SecureCloud™ protects critical data stored on cloud devices by using full-disk encryption, including protecting boot volumes for cloud environments via boot volume encryption and policy-based key management and unique server validation. The SecureCloud™ key management and data encryption may be implemented as a software application or software-as-a-service (SaaS).

As an example, the disk drives for boot volumes for cloud environments may be encrypted, as well as data and ephemeral storage devices and RAID devices. A web console may be used to for an administrator to define criteria on which instances can receive encryption/decryption keys. A SecureCloud™ runtime agent is installed on a newly supported platform.

The SecureCloud™ software/service has been based on a fully Virtual Machine (VM) model. In this implementation, root volume encryption in a fully virtualized Linux virtual machine is a way to improve computer security. A root volume encryption of a fully virtualized virtual machine software includes providing an interface to virtual machines that is identical to that of the underlying hardware.

The full virtualization includes a complete simulation of the underlying hardware and a booting process, such as: BIOS→Master Boot Record (MBR)→Grand Unified Bootloader (Grub)→Kernel. Examples of applications include supporting boot volume encryption in a Linux system under a fully virtualized Virtual Machine.

FIG. 1 illustrates a disk layout of a fully virtualized Virtual Machine (VM) implementation for SecureCloud™. Encrypted regions are illustrated as shaded areas. The Master Boot Record (MBR) is illustrated as well as the boot partition and an encrypted root partition. FIG. 1 also shows the portion of the boot partition including the original stage 2 loader, resized files system, and boot image. The boot image further includes portions for a SecureCloud™ Boot Partition, SecureCloud™ root image (storing a pre-boot agent), a scratchspace, and a SecureCloud™ stage 2 loader.

FIG. 2 illustrates a setkey flow of a fully virtualized VM in a SecureCloud™ implementation. FIG. 2 illustrates the key flow interaction between the disk layout, the BIOS, memory, a key request, a setkey, and a reboot operation.

FIG. 3 illustrates the boot flow after setkey of a fully virtualized VM, showing aspects of operation of the BIOS, MBRs, stage 2 loader, kernel, and initrd, and the portion responsible for loading a temporary file system into memory in the boot process.

FIG. 4 illustrates pre-boot image installation flow in a fully virtualized VM. The flow includes the steps of unmounting the boot partition, resizing the boot filesystem, installing the pre-boot image, backing up the original MBR, installing the SecureCloud™ MBR, backing up the SecureCloud™ MBR, initializing the scratch space, configuring a stage 2 loader, patching the initrd, and rebooting the VM.

While a fully virtualized VM is useful, it also has disadvantages associated with its need to include a complete simulation of the underlying hardware. The present invention was developed in view of the shortcomings and limitations of full virtualization for root volume encryption in a VM.

SUMMARY OF THE INVENTION

An apparatus, system, and method for performing boot volume encryption in a para-virtualized virtual machine is disclosed. In one embodiment, the para-virtualized virtual machine is a para-virtualized Linux virtual machine. An example application is for use in providing data protection for the memory/disks of computer systems, such as those in communication with cloud-based or web-based services.

An example of a method of providing security for a memory accessible by a cloud-based web service, comprises performing boot volume encryption in a para-virtualized virtual machine. An example of a system including a computer system having a hypervisor and a memory, including means for performing boot volume encryption in a para-virtualized virtual machine.

DETAILED DESCRIPTION

The present invention is generally directed to support for booting and utilization of an encrypted boot volume in a partially virtualized VM, such as a partially virtualized (PV) Linux (open source) system. Individual embodiments of the present invention also support features such as pre-boot authentication, performing installation automatically, not requiring other resources during the installation process, and providing in-place encryption. In particular, in one embodiment the present invention is directed to supporting para-virtualizations that uses pv-grub to boot. Exemplary embodiments include applications on systems including a hypervisor, such as Xen hypervisor.

Figure 1:
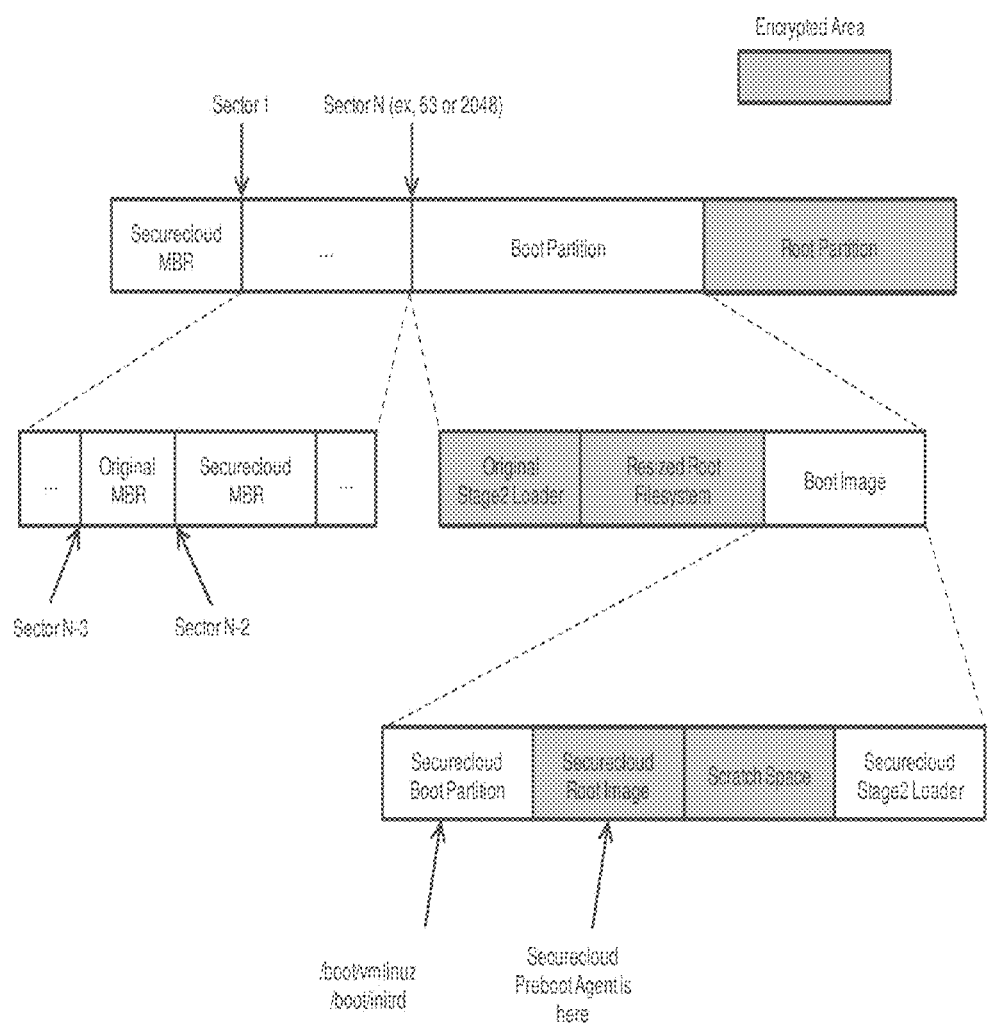
FIG. 1 illustrates a disk layout of a fully virtualized VM in accordance with the prior art.
Figure 2:
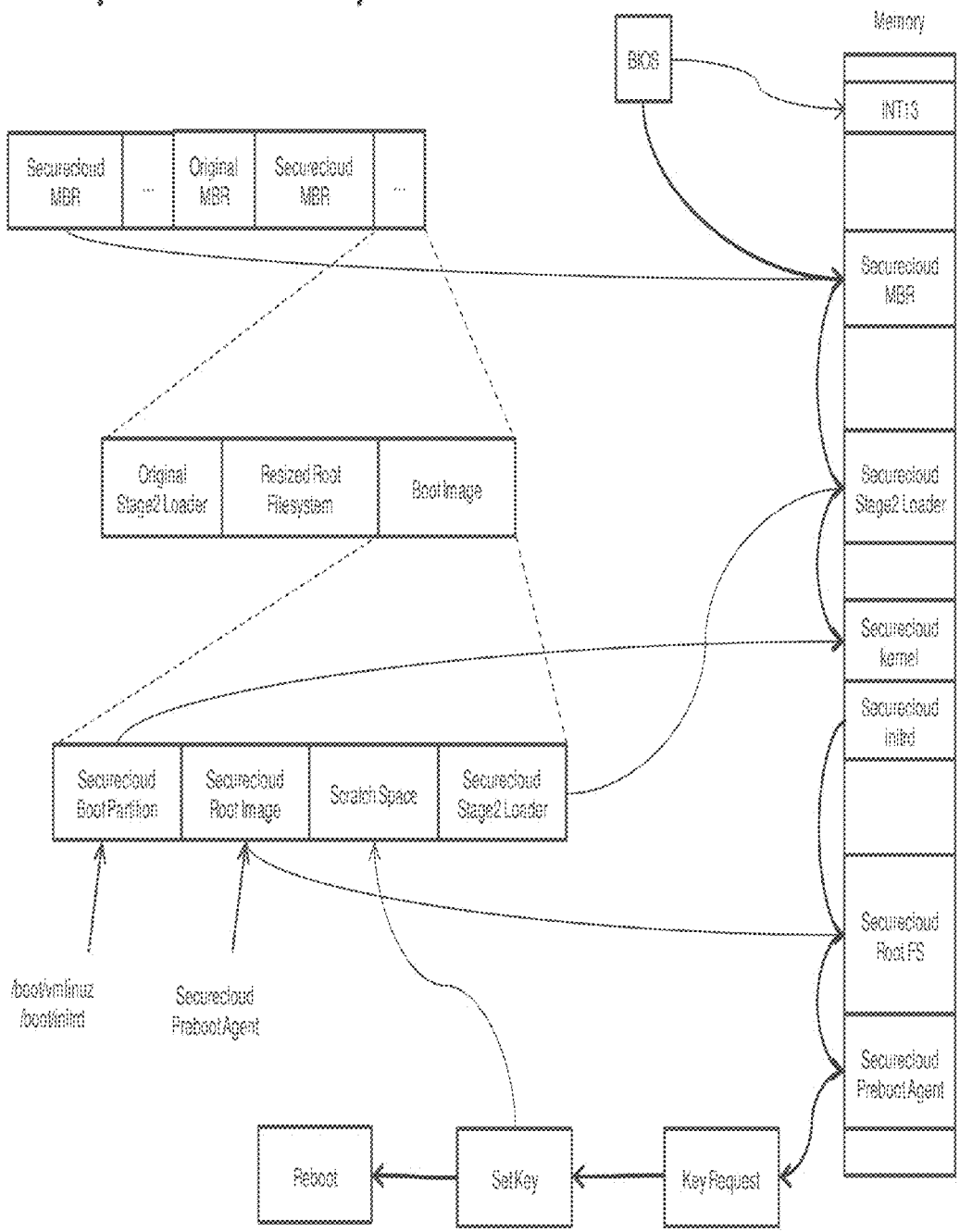
FIG. 2 illustrates a setkey flow of a fully virtualized VM in accordance with the prior art.
Figure 3:
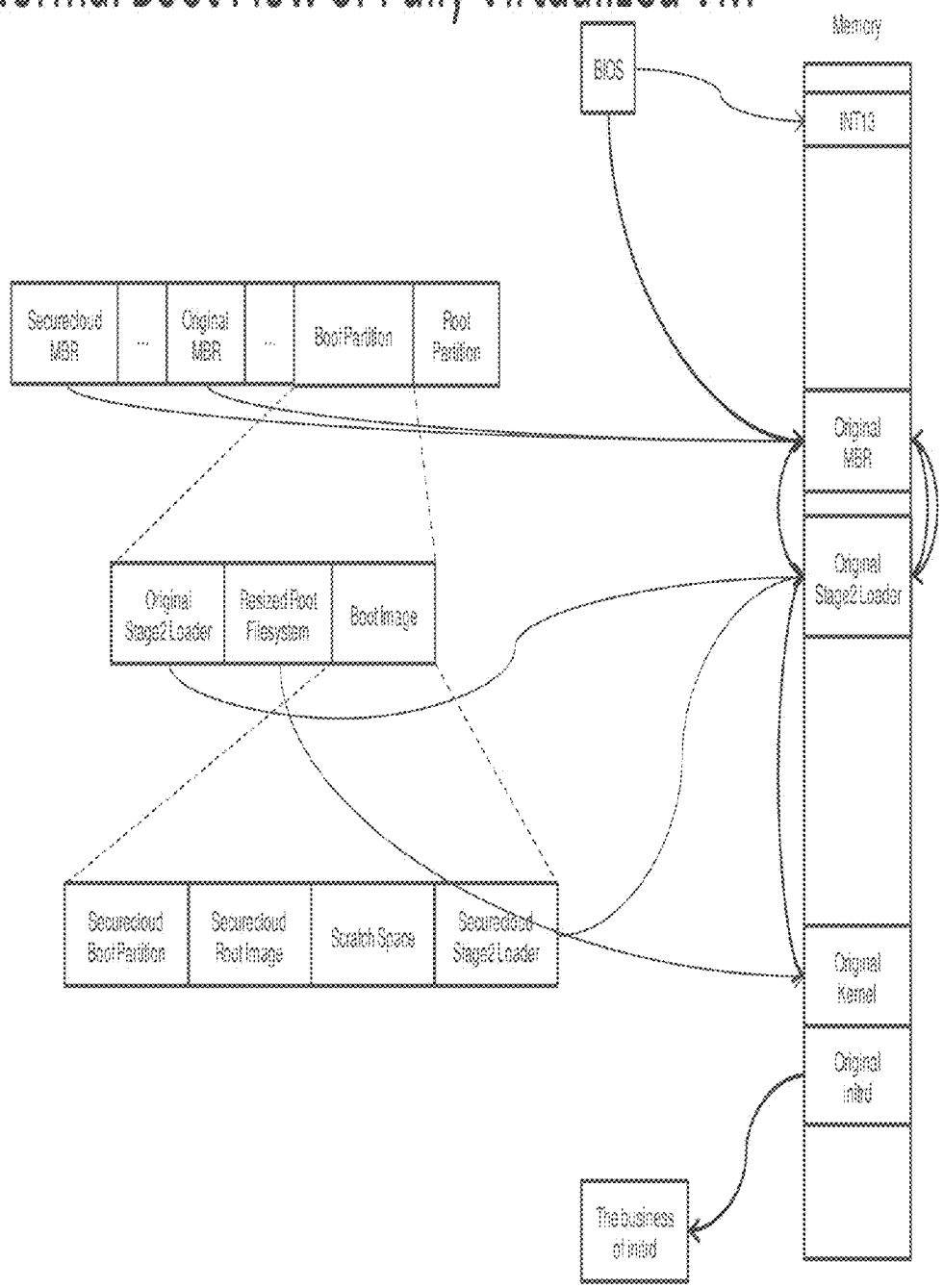
FIG. 3 illustrates a boot flow after set key of a fully virtualized VM in accordance with the prior art.
Figure 4:
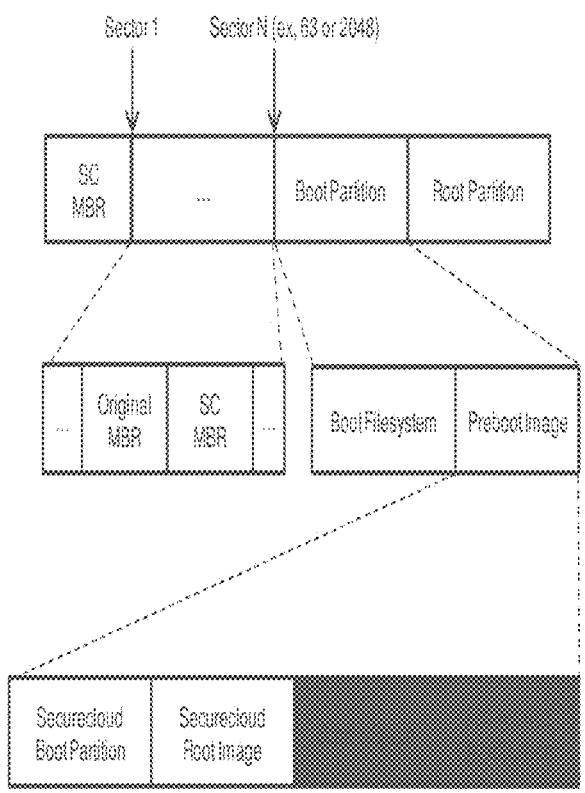
FIG. 4 illustrates pre-boot image installation flow in a fully virtualized VM.
Figure 5A:
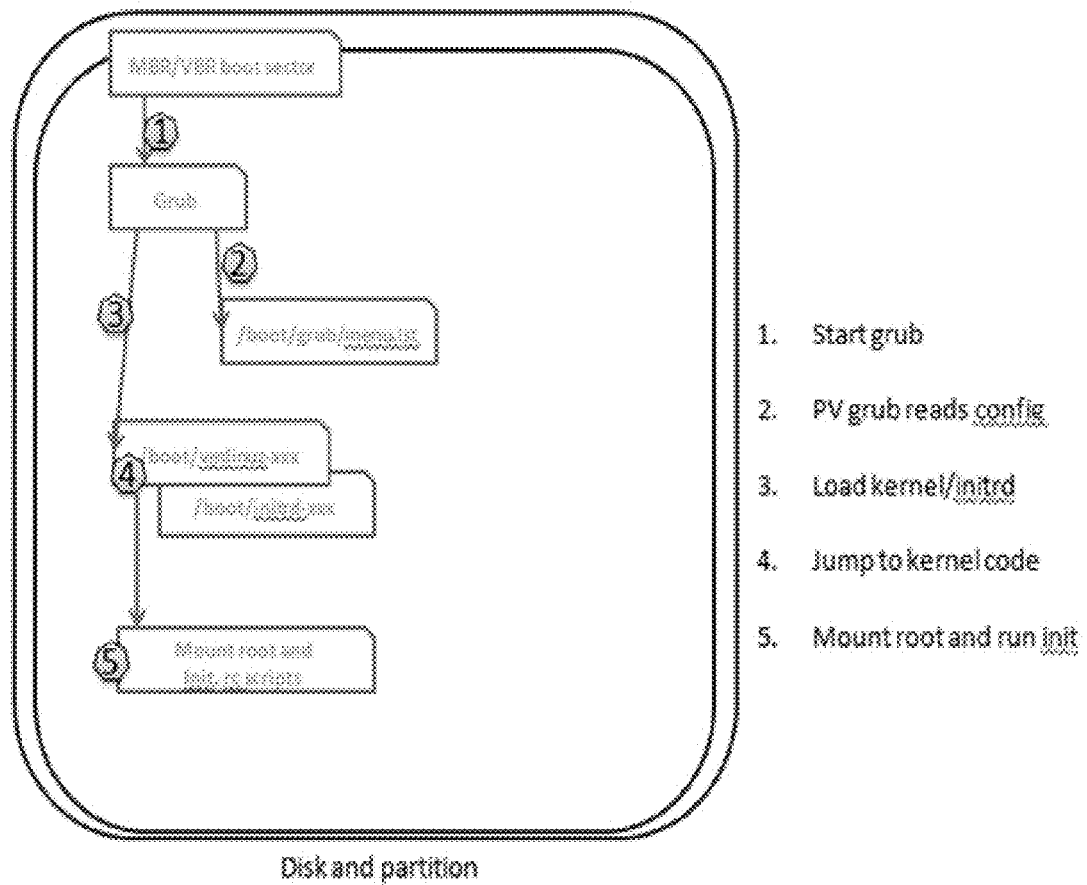
FIG. 5A is a high level flow chart illustrating starting of a PV Linux based system in accordance with an embodiment of the present invention.

FIG. 5A shows a high level sequence for booting a PV Linux system. High level steps may include: 1) starting a PV grub, 2) the PV grub reads the configuration, 3) a load kernel/initrd, 4) a jump to kernel code, and 5) a mount root and run initrd. In one embodiment, a file system is stored on the disk. For example, the file system may be stored in a partition of the disk. A hypervisor, such as a Xen hypervisor, may be employed to support the para-virtualization. In one embodiment, para-virtualization guests may work over a software interface with a hypervisor. The boot volume is encrypted and a key flow procedure is invoked as part of the process. An exemplary application is as part of the SecureCloud™ system to replace full-virtualization. However, it will be understood that the present invention is not limited to a SecureCloud™ implementation.

Figure 5B:
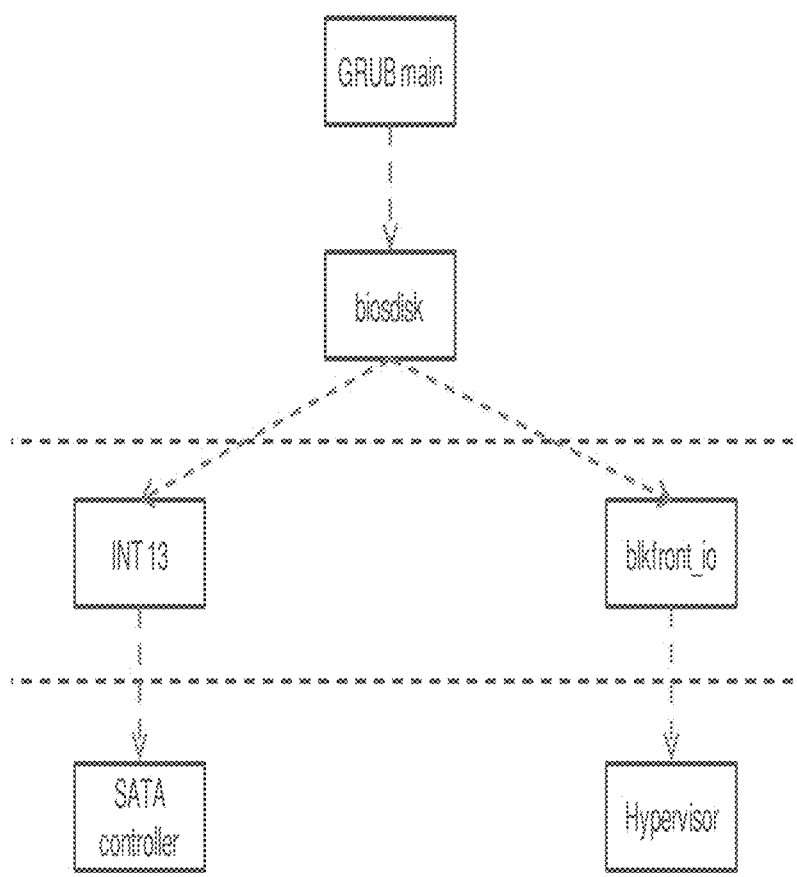
FIG. 5B illustrates a comparison of full virtualization and partial virtualization in accordance with an embodiment of the present invention.

FIG. 5B illustrates a comparison between conventional full virtualization and partial virtualization. Full virtualization includes a complete simulation of the underlying hardware with a booting process of: Booting process: BIOS→MBR→Grub→Kernel. Para-virtualization (PV) presents a software interface to virtual machines that is similar, but not identical to that of the underlying hardware. The booting process for PV is: booting process: Hypervisor→PV-Grub→Kernel. A traditional Grub works on the physical layer. In one embodiment, the PV-Grub is a modified version of a Grub having a line interface configured for a PV implementation, with the PV-Grub working on common reads by the hypervisor.

An example of boot volume encryption in a Linux system under para-virtualized VM will now be described. While Linux is used as an example, it will be understood that other implementations are also possible. An illustrative example of a PV implementation of the SecureCloud™ product of Trend Micro, Inc., which may be used with Amazon Web Services™ (AWS), although it will be understood that the present invention is not limited to this implementation. More generically it will also be understood that embodiment of the present invent ion may be practiced on a XenServer, as AWS is based on a Xen Server implementation.

Figure 5C:
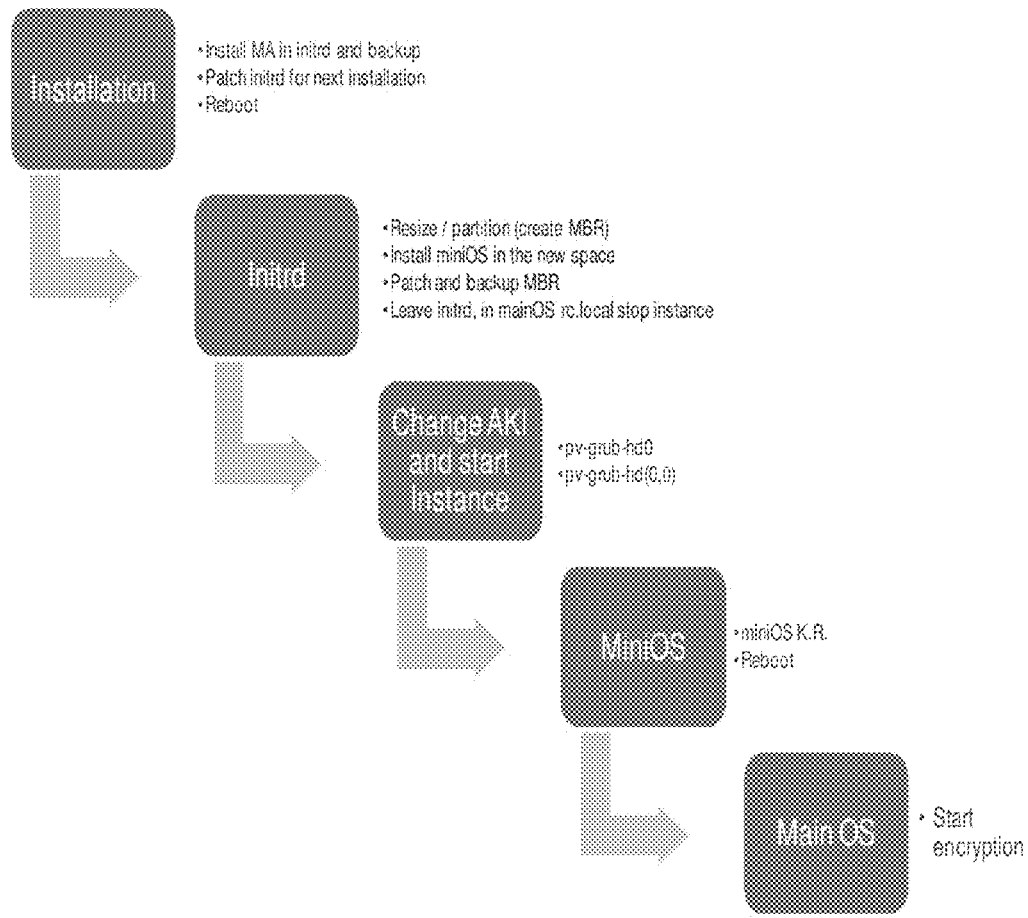
FIG. 5C illustrates a process flow for a first time install pre-boot and encryption boot in accordance with an embodiment of the present invention.

FIG. 5C shows an example of a pre-boot OS installation. In this example, it will generate two versions of initrd. One version of the initrd is used for installation, and another version will insert MA driver inside for a further boot. As an example, it may include a main OS state to install a Mobile Armor Driver (MA) driver (or more generically an encryption driver) in initrd and backup, patch initrd for next installation, and reboot. The initrd may perform operations such as resizing, installing a miniOS, patching and backup of MBR. A miniOS may perform preboot encryption and a reboot.

Figure 6:
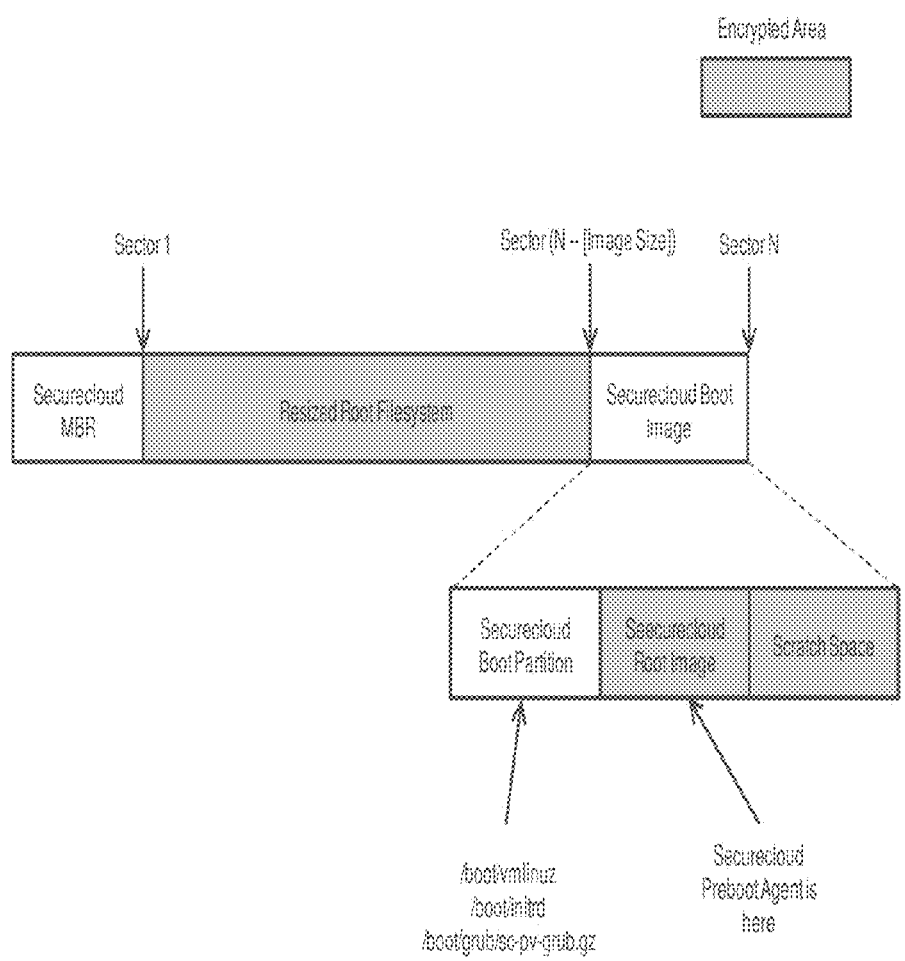
FIG. 6 illustrates a disk layout of a para-virtualized VM in accordance with an embodiment of the present invention.

FIG. 6 illustrates a disk layout of a para-virtualized VM. A file system is transformed into a disk layout detectable by a hypervisor, which minimizes data moves. The structure is arranged so that a hypervisor will detect the resized root filesystem as a disk bootup OS in an encrypted file system in which the storage can only be to the file system.

Figure 7:
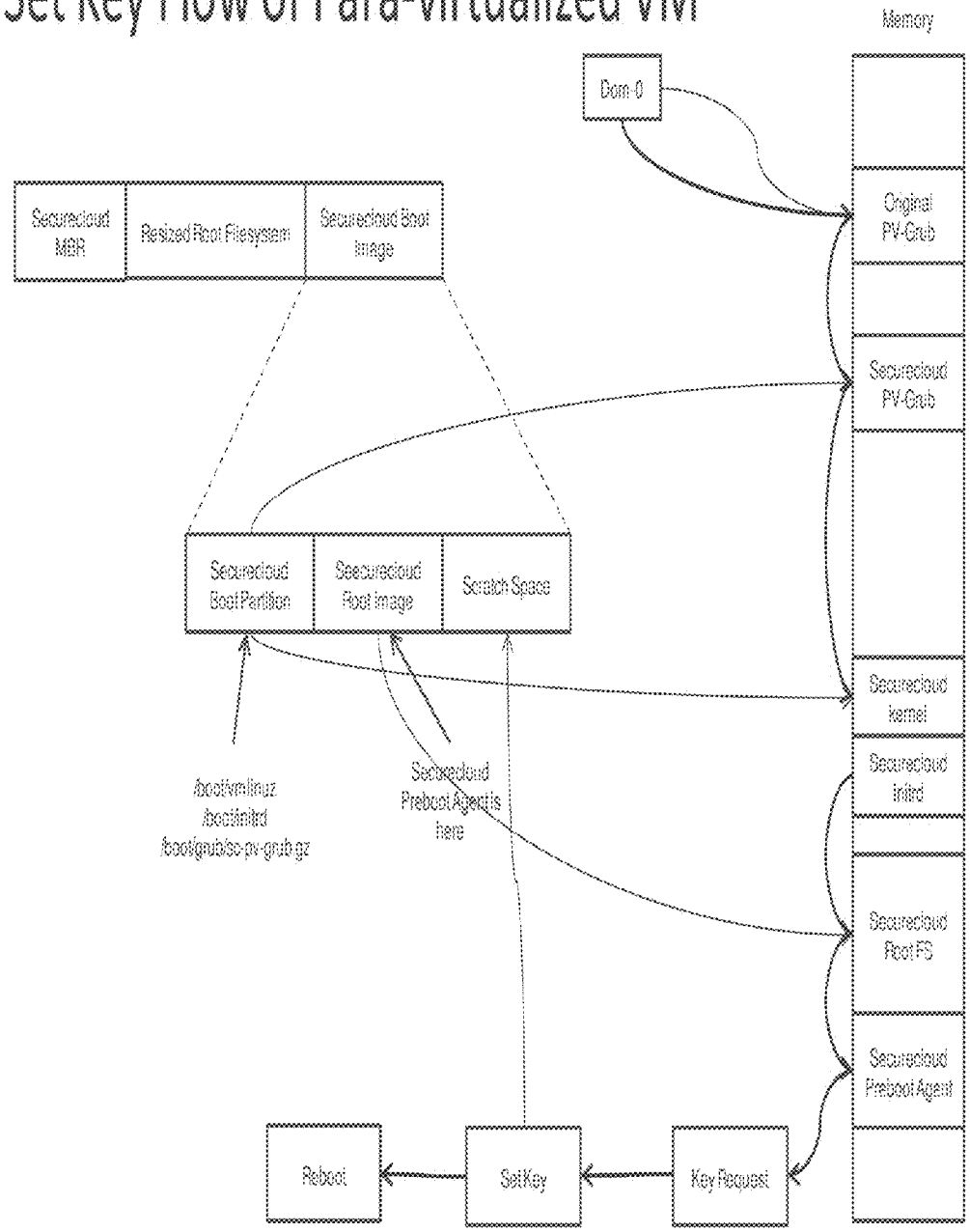
FIG. 7 illustrates a setkey flow of a para-virtualized virtual machine in accordance with an embodiment of the present invention.
Figure 8:
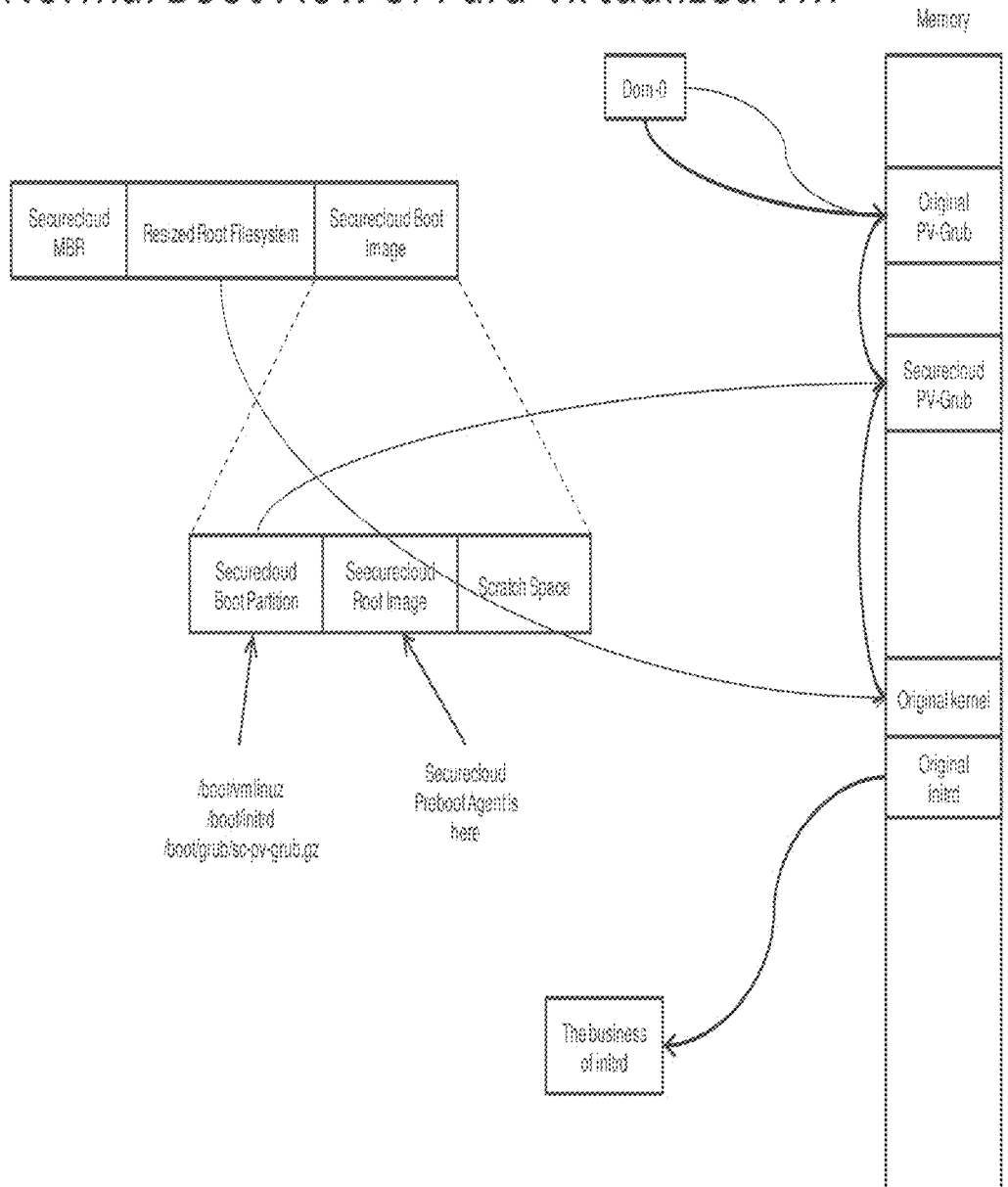
FIG. 8 illustrates a boot flow after set key of a para-virtualized VM in accordance with an embodiment of the present invention.

FIG. 7 illustrates a setkey flow of a para-virtualized VM. A modified bootcode in the MBR may be used to discover the preferred OS to decrypt the disk to boot. FIG. 8 illustrates boot flow after setkey of the para-virtualized VM.

Figure 9:
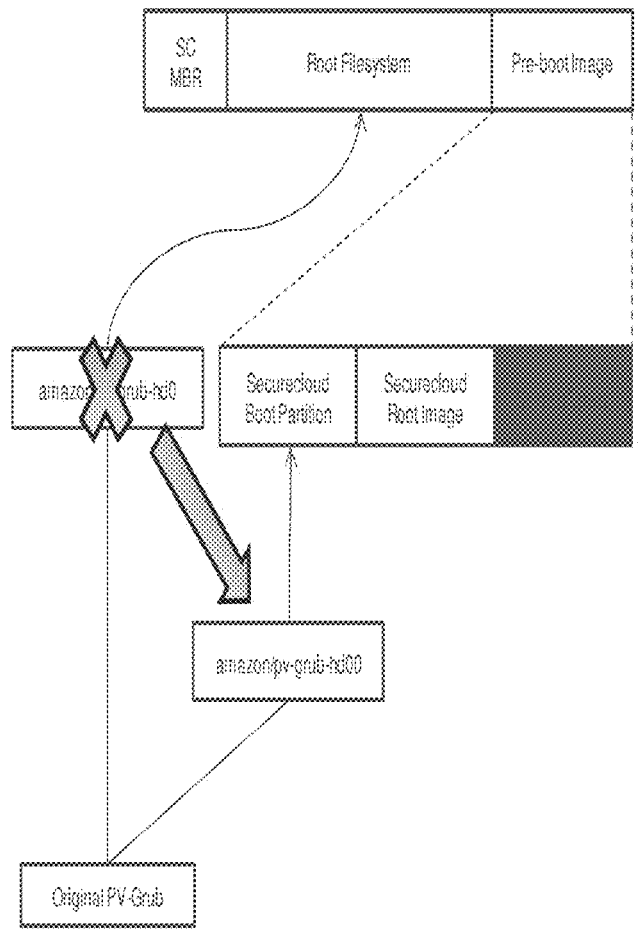
FIG. 9 illustrates pre-boot image installation flow in a para-virtualized VM in accordance with an embodiment of the present invention.

FIG. 9 illustrates pre-boot image installation in a para-virtualized VM. In this example an Amazon Kernel Image (AKI) is changed from hd0 to hd00. For an AWS implementation, after enabling boot volume encryption in AWS the kernel-id is changed to pv-grub-hd(0,0). In this example a profile is created for an installer. The installer is then injected into initrd. The VM is rebooted. A resized root filesystem is accessed. A dummy MBR is created. A re-boot image is installed. Scratch space is initialized. A patch of initrd is performed. The VM is shutdown. The AKI is then changed.

As previously discussed, embodiments of the present invention are not limited to an AWS implementation. In a generic XenServer implementation, the methods are nearly the same. However, in a XenServer implementation, there is an editing of config from hd(0) to hd(0,0) (in contrast, in AWS the change is to AKI). That is, the changing of the pv-grub setting is generically changed from hd(0) to hd(0,0) in a generic XenServer implementation.

Additionally, as previously mentioned, embodiments of the present invention include all para-virtualization approaches that uses a pv-grub to boot.

Computer System Embodiment

As previously discussed, embodiments of the present invention may be employed as software or as a software based service to perform boot volume encryption of a memory, such as a disk. The memory may be part of a computer system employing a hypervisor, such as a computer system accessible via a web-based or cloud-based service. An example of a general computer system environment will now be described.

Figure 10A:
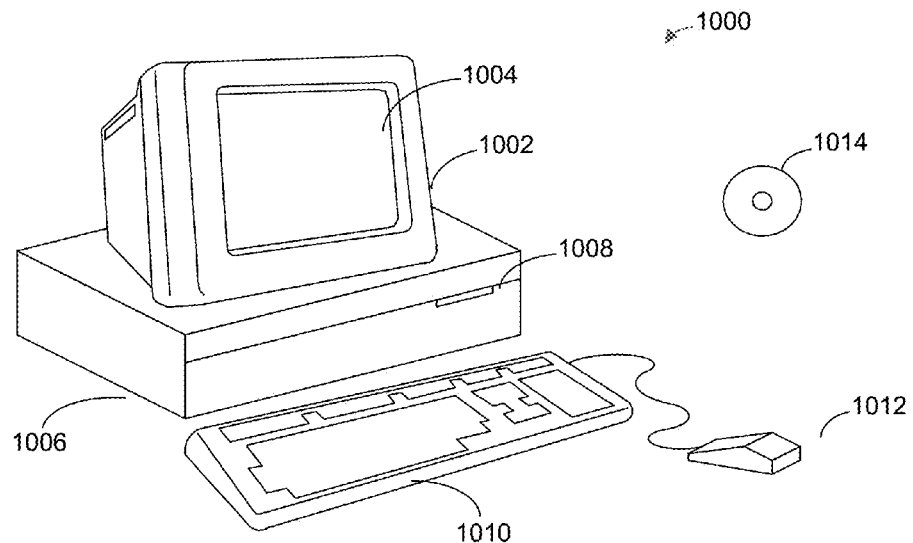
FIGS. 10A and 10B illustrate an exemplary computer system environment for practicing embodiments of the present invention.
Figure 10B:
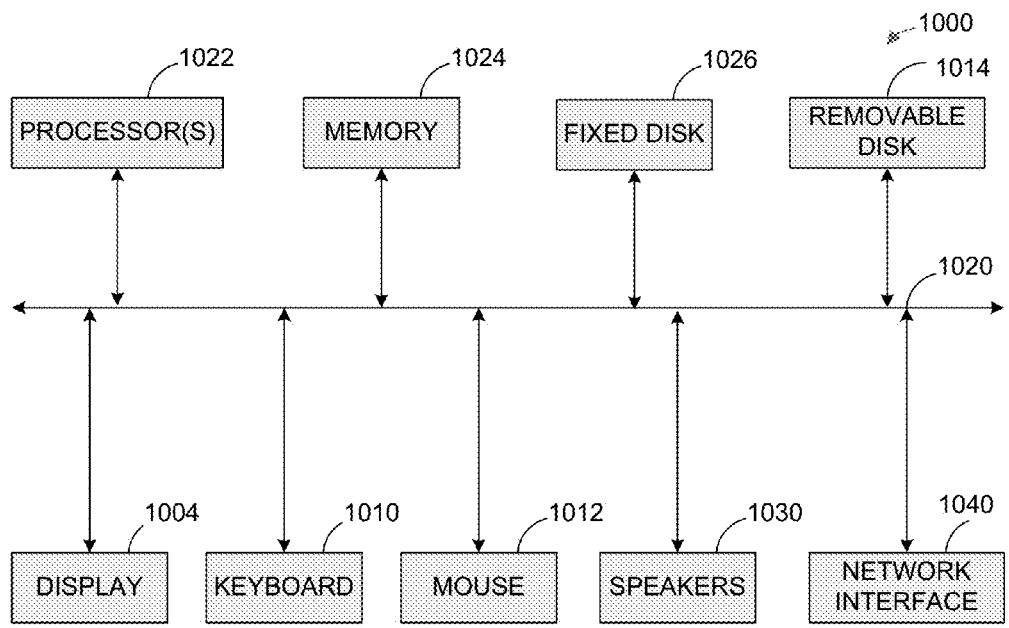

FIGS. 10A and 10B illustrate a computer system 1000 suitable for implementing embodiments of the present invention. FIG. 10A shows one possible physical form of the computer system. Of course, the computer system may have many physical forms including an integrated circuit, a printed circuit board, a small handheld device (such as a mobile telephone or PDA), a personal computer or a super computer. Computer system 1000 includes a monitor 1002, a display 1004, a housing 1006, a disk drive 1008, a keyboard 1010 and a mouse 1012. Disk 1014 is a computer-readable medium used to transfer data to and from computer system 1000.

FIG. 10B is an example of a block diagram for computer system 1000. Attached to system bus 1020 are a wide variety of subsystems. Processor(s) 1022 (also referred to as central processing units, or CPUs) are coupled to storage devices including memory 1024. Memory 1024 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memory may include any suitable of the computer-readable media described below. A fixed disk 1026 is also coupled bi-directionally to CPU 1022; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 1026, may, in appropriate cases, be incorporated in standard fashion as virtual memory in memory 1024. Removable disk 1014 may take the form of any of the computer-readable media described below.

CPU 1022 is also coupled to a variety of input/output devices such as display 1004, keyboard 1010, mouse 1012 and speakers 1030. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 1022 optionally may be coupled to another computer or telecommunications network using network interface 1040. With such a network interface, it is contemplated that the CPU might receive information from the network, or might output information to the network in the course of performing the above-described method steps. Furthermore, method embodiments of the present invention may execute solely upon CPU 1022 or may execute over a network such as the Internet in conjunction with a remote CPU that shares a portion of the processing.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

What is claimed is:

1. A method of providing security for a memory accessible by a cloud-based web service, comprising:
   providing a disk layout including a root file system section to support a mini-OS to perform pre-boot encryption;
   performing boot volume encryption in a para-virtualized (PV) virtual machine (VM) wherein the boot volume encryption is for a disk of a system accessible by the cloud-based web service;
   wherein the mini OS is installed; and wherein the mini OS performs pre-boot encryption;
   wherein a booting process includes a hypervisor accessing a para-virtualized Grub and loading a kernel; and
   wherein the performing boot volume encryption includes a pre-boot image installation flow in the para-virtualized VM, wherein the pre-boot image installation flow comprises:
   creating a profile for an installer;
   injecting an installer into initrd;
   rebooting the VM,
   resizing a root file system,
   creating a dummy MBR,
   installing a pre-boot image,
   initializing a scratch space,
   patching initrd,
   shutting down the VM, and
   changing a pv-grub setting.

2. The method of claim 1, further including a pre-boot image installation flow in the para-virtualized VM.

3. The method of claim 2, comprising changing a PV-Grub setting.

4. A method of providing security for a memory accessible by a cloud-based web service, comprising:
   performing boot volume encryption in a para-virtualized (PV) virtual machine (VM) including a pre-boot image installation flow in the para-virtualized VM;
   wherein the pre-boot image installation flow comprises:
   creating a profile for an installer;
   injecting an installer into initrd;
   rebooting the VM,
   resizing a root file system,
   creating a dummy MBR,
   installing a pre-boot image,
   initializing a scratch space,
   patching initrd,
   shutting down the VM, and
   changing a pv-grub setting.

5. The method of claim 4, wherein the pv-grub setting is changed from hd(0) to hd(0,0).

6. The method of claim 4, wherein the pv-grub setting is changed to AKI.

7. A method of performing boot volume encryption in a para-virtualized virtual machine for a memory accessible by a cloud-based service, comprising:
   implementing a disk layout configured to support boot volume encryption for the para-virtualized virtual machine (VM);
   performing a set key flow of the para-virtualized virtual machine utilizing the disk layout;
   performing a boot flow of the para-virtualized virtual machine utilizing the disk layout; and
   performing a preboot installation in the para-virtualized virtual machine, comprising:
   creating a profile for an installer;
   injecting an installer into initrd;
   rebooting the VM,
   resizing a root file system,
   creating a dummy MBR,
   installing a pre-boot image,
   initializing a scratch space,
   patching initrd,
   shutting down the VM, and
   changing a pv-grub setting;
   wherein the disk layout includes a master boot record in a first sector, a resized root file system, and a boot image, the boot image including a boot partition, root image for an pre-boot agent, and a scratch space.

8. The method of claim 7, wherein the pv-grub setting is changed from hd(0) to hd(0,0).

9. The method of claim 7, wherein the pv-grub setting is changed to AKI.

* * * * *